US009767590B2

(12) United States Patent
Jaffrain

(10) Patent No.: US 9,767,590 B2
(45) Date of Patent: Sep. 19, 2017

(54) TECHNIQUES FOR TRANSFORMING A MULTI-FRAME ASSET INTO A SINGLE IMAGE

(71) Applicant: Apple Inc., Cupertino, CA (US)

(72) Inventor: Gael Jaffrain, Santa Cruz, CA (US)

(73) Assignee: APPLE INC., Cupertino, CA (US)

( * ) Notice: Subject to any disclaimer, the term of this patent is extended or adjusted under 35 U.S.C. 154(b) by 14 days.

(21) Appl. No.: 14/921,710

(22) Filed: Oct. 23, 2015

(65) Prior Publication Data

US 2017/0116767 A1 Apr. 27, 2017

(51) Int. Cl.

*G06T 5/50* (2006.01)
*G06T 11/60* (2006.01)
*G06T 11/20* (2006.01)
*G06F 3/0488* (2013.01)

(52) U.S. Cl.

CPC ............ *G06T 11/60* (2013.01); *G06F 3/0488* (2013.01); *G06T 11/20* (2013.01); *G06T 5/50* (2013.01)

(58) Field of Classification Search

CPC . G06T 11/20; G06T 11/60; G06T 5/50; G06F 3/0488

See application file for complete search history.

(56) References Cited

U.S. PATENT DOCUMENTS 7,084,875 B2 8/2006 Plante
8,270,764 B1 * 9/2012 Agarwala .............. G06T 11/60 345/629
8,451,277 B2 5/2013 Whited et al.
8,644,644 B2 2/2014 Yadav
2006/0104542 A1 * 5/2006 Blake .................... G06K 9/469 382/284
2010/0134499 A1 * 6/2010 Wang ...................... G06T 13/80 345/473
2010/0310193 A1 * 12/2010 Castleman ............. G06T 11/00 382/296
2012/0173822 A1 * 7/2012 Testardi ............. G06F 11/1453 711/135
2013/0077890 A1 * 3/2013 Chen ....................... G06T 5/002 382/275
2013/0121569 A1 * 5/2013 Yadav ...................... G06T 5/50 382/164
2013/0330007 A1 * 12/2013 Kim ........................ G06K 9/46 382/195
2014/0267303 A1 9/2014 Larkin et al.
2015/0277653 A1 * 10/2015 Xiong .................. G06F 3/0414 345/173

FOREIGN PATENT DOCUMENTS

CN 102197414 A 9/2011

* cited by examiner

*Primary Examiner* — Yubin Hung

(74) *Attorney, Agent, or Firm* — Fletcher Yoder PC

(57) ABSTRACT

The present techniques relate to transforming a multi-frame asset, such as a time-lapse video or panoramic view, into a single image. The technique generally involves displaying a frame from the multi-frame asset on a display, and compressing the multi-frame assent into a single image based on a relation of pixel locations on the display to a path disposed on the display.

25 Claims, 14 Drawing Sheets

58

EXTRACT N FRAMES FROM MULTI-FRAME ASSET — 60

ASSOCIATE EACH OF THE N FRAMES TO A PORTION OF THE PATH — 61

CORRELATE EACH PIXEL LOCATION TO A POSITION ON THE PATH — 62

SELECT THE FRAME CORRESPONDING TO EACH PORTION OF THE PATH — 64

EXTRACT THE PIXEL VALUE AT EACH PIXEL LOCATION ASSOCIATED WITH THE SELECTED FRAME — 66

GENERATE IMAGE USING EXTRACTED PIXEL VALUE FOR EACH PIXEL LOCATION — 68

138

18

188
112
18

TECHNIQUES FOR TRANSFORMING A MULTI-FRAME ASSET INTO A SINGLE IMAGE

BACKGROUND

The present disclosure relates generally to image manipulation techniques and, more particularly, to techniques for transforming a multi-frame asset into an image.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The technology to store images digitally has existed for at least the past fifty years. Indeed, rapid advances in digital imaging occurred with the introduction of microprocessors in the 1970's, and significant advances in microprocessor and memory technology have virtually eliminated the use of film and tape in photography and videography. Each digital image or frame is stored as an array of pixels, and the color and intensity of each pixel is determined by its digital value, where each digital value includes a number of bits per pixel. For example, a pixel having eight bits per pixel can represent two hundred fifty-six different colors, whereas a pixel having twenty-four bits per pixel can represent over sixteen million colors.

Not too surprisingly, because each pixel is defined by a digital value, digital images can be altered or edited by changing the value of selected pixels. Indeed, shortly after the introduction of digital images, graphics software, sometimes referred to as video or image editing software, emerged. In the early 1990's Adobe introduced Photoshop® exclusively for use on MacIntosh computers, and it has evolved over the years to become one of the most popular photo and video editing programs in the world.

While early photo and video editing programs were originally conceived to simply improve or enhance images, such as by providing color editing, digital retouching, special effects and the like, users found that such editing programs could be used to produce all sorts of humorous and artistic image alterations. For example, images could be altered to attach one person's head to another person's body, to turn a color image into a more artistic black and white image, etc. Furthermore, with the advent of smart phones (and apps that run on them), photo and video editing programs became widely available to the general populace, both for more traditional uses such as removing red-eye or improving contrast a photo, as well as for more humorous or artistic purposes. As one example, Crazy Helium Booth produced by Appkruti Solutions LLP allows users to create photographs having funny faces such as might be produced by a wavy mirror in a funhouse, as well as videos that alter a user's face and voice.

Programs for altering images or videos for humorous or artistic purposes have proven quite popular. Nevertheless, even though a number of programs exist, they are all fairly similar to one another. Further none of the available programs convert a multi-frame media asset, such as a video or panoramic view, into humorous or artistic single frame image.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

There is disclosed a method of transforming a multi-frame asset into a single image. The method may include displaying a frame from the multi-frame asset on a display, and compressing the multi-frame assent into a single image based on a relation of pixel locations on the display to a path disposed on the display.

The method of transforming or compressing a multi-frame asset into a single image may include: extracting a plurality of frames from a multi-frame asset; associating each of the plurality of extracted frames to a respective portion of a path disposed on a display; correlating each pixel location on the display to a position on the path; for each of the respective extracted frames, extracting pixel values from the extracted frame for each pixel location correlated to a position on the path that is associated with the respective extracted frame; and generating a single image using the extracted pixel value for each pixel location on the display.

There is also disclosed an electronic device that may include a display, a processor operably coupled to the display, and a memory operably coupled to the processor. The memory may store instructions that when executed by the processor cause the electronic device to: extract a plurality of frames from a multi-frame asset; associate each of the plurality of extracted frames to a respective portion of a path disposed on the display; correlate each pixel location on the display to a position on the path; for each of the respective extracted frames, extract pixel values from the extracted frame for each pixel location correlated to a position on the path that is associated with the respective extracted frame; generate a single image using the extracted pixel value for each pixel location on the display; and display the single image on the display.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques described in detail below relate to transforming a multi-frame asset into a single image. The resulting image may have humorous or artistic qualities. The technique generally involves displaying a frame from the multi-frame asset on a display, and compressing the multi-frame assent into a single image based on a relation of pixel locations on the display to a path disposed on the display.

Figure 1:
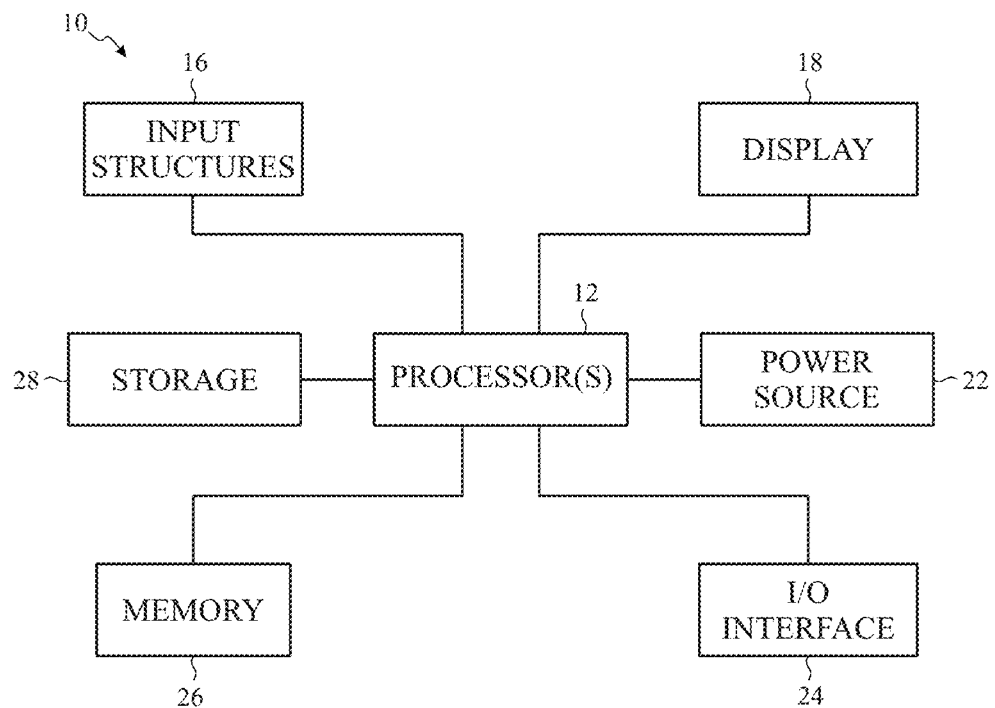
FIG. 1 is a schematic block diagram of an electronic, in accordance with an embodiment.

With these features in mind, the following presents a general description of various systems and techniques for transforming a multi-frame asset into a single image. Turning first to FIG. 1, an electronic device 10 according to an embodiment of the present disclosure may include, among other things, one or more processor(s) 12, memory 14, nonvolatile storage 16, a display 18 input structures 22, an input/output (I/O) interface 24 and a power source 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in the electronic device 10.

Figure 2:
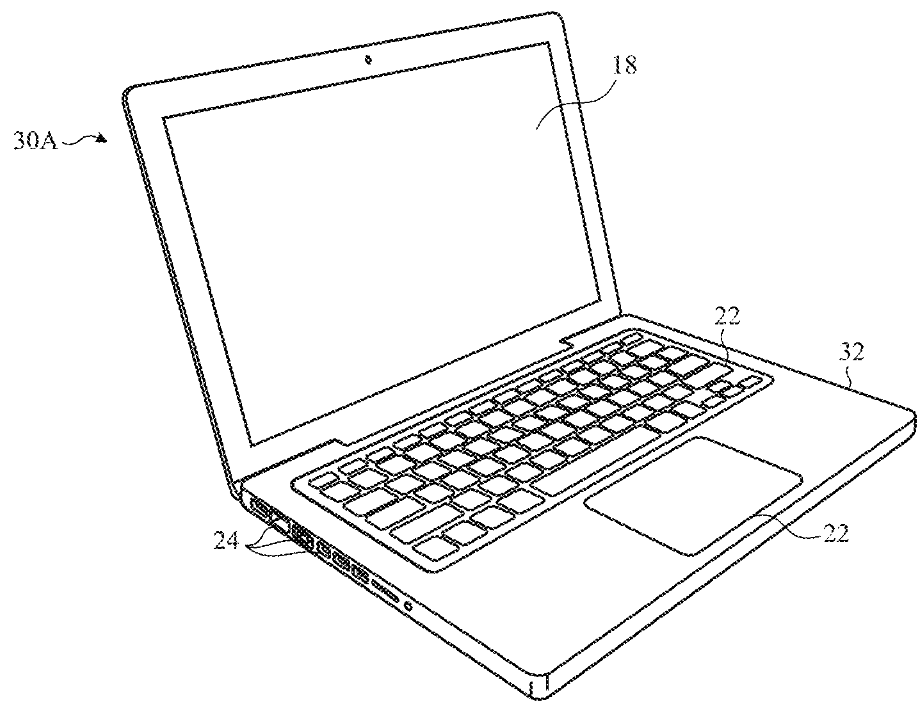
FIG. 2 is a perspective view of a notebook computer representing an embodiment of the electronic device of FIG. 1, in accordance with an embodiment.
Figure 3:
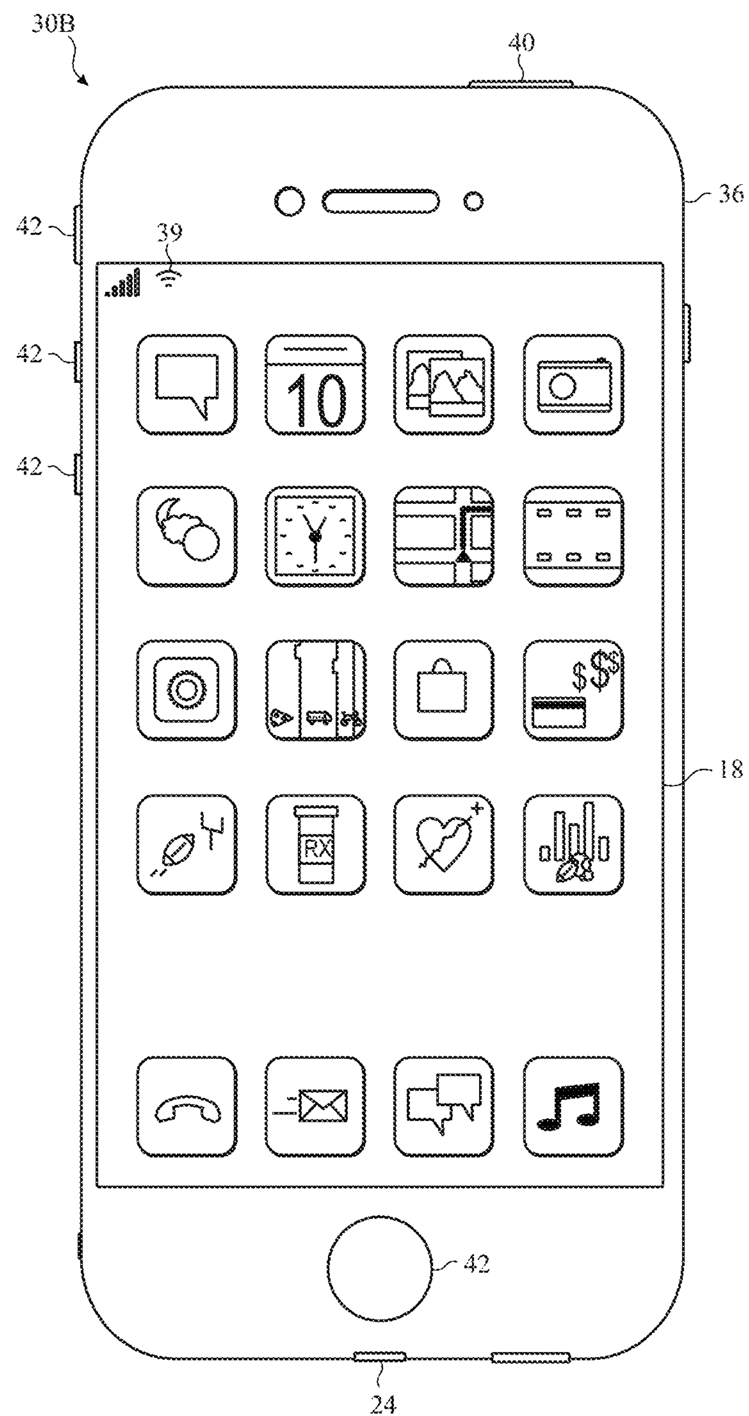
FIG. 3 is a front view of a hand-held device representing another embodiment of the electronic device of FIG. 1, in accordance with an embodiment.
Figure 4:
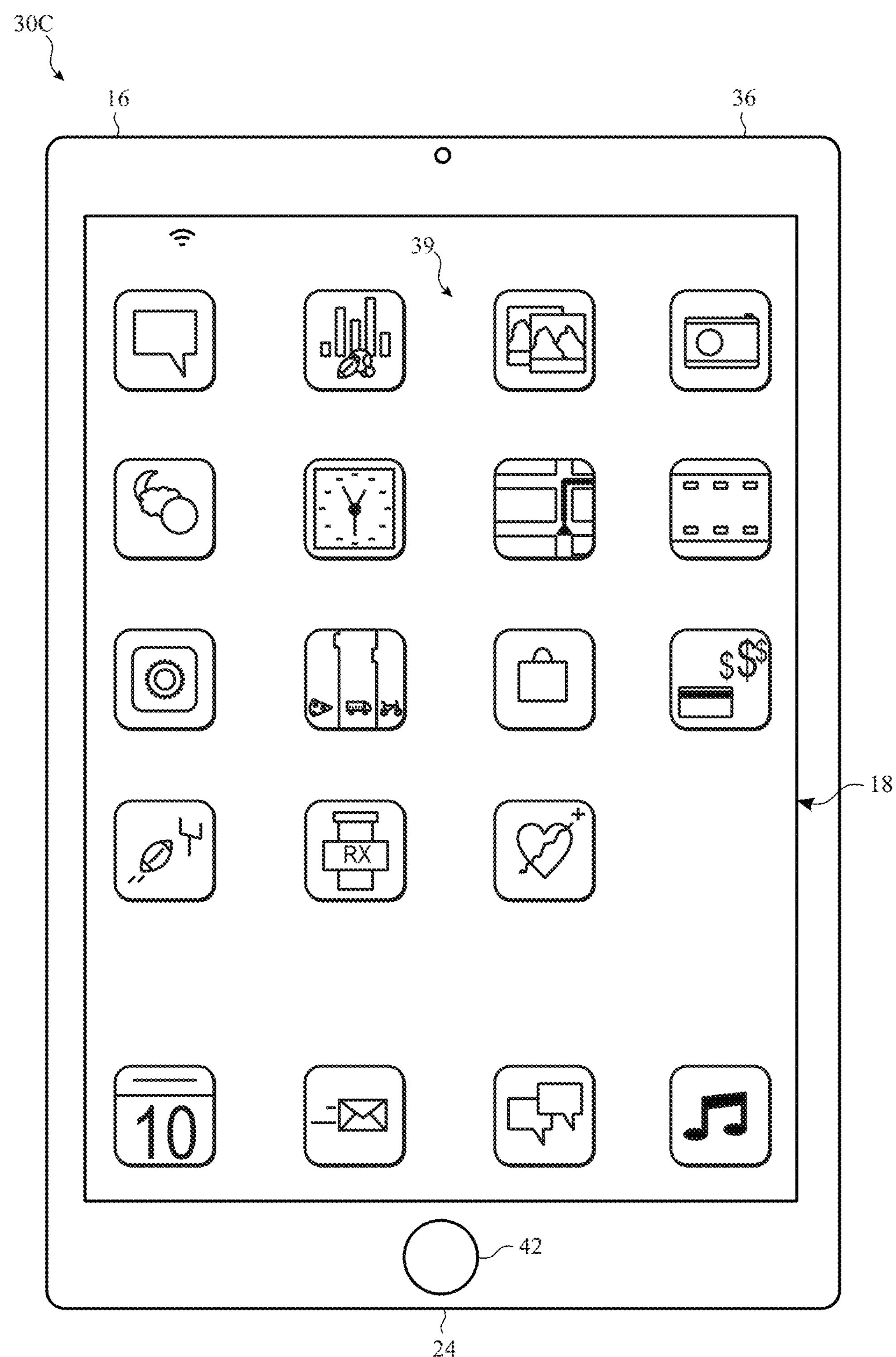
FIG. 4 is a front view of another hand-held device representing another embodiment of the electronic device of FIG. 1, in accordance with an embodiment.
Figure 5:
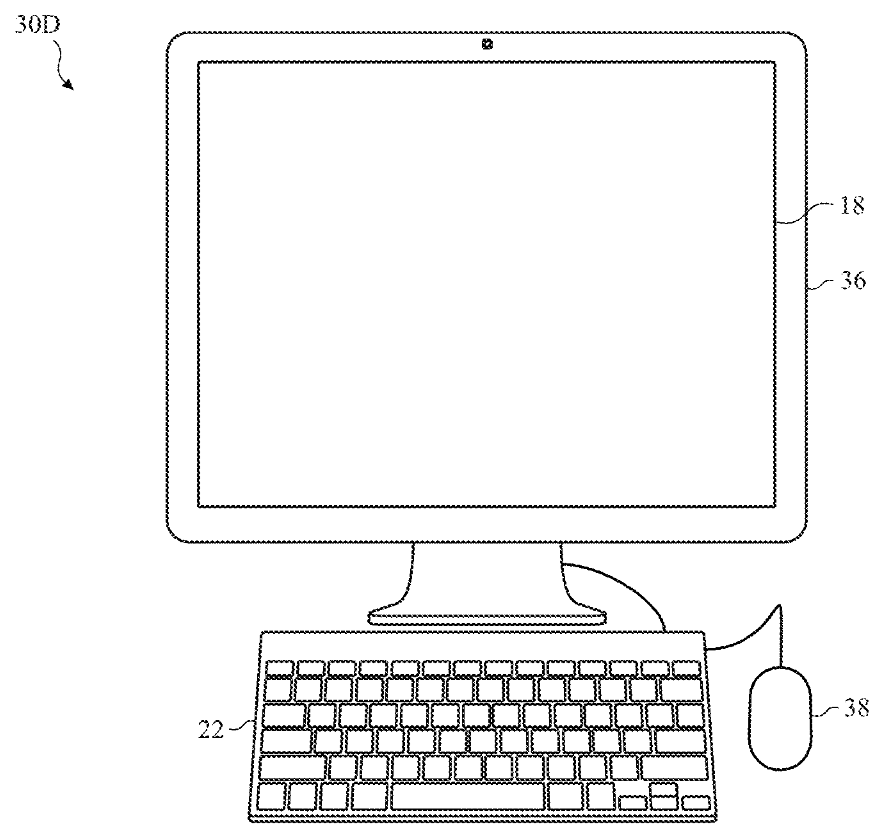
FIG. 5 is a front view of a desktop computer representing another embodiment of the electronic device of FIG. 1, in accordance with an embodiment.
Figure 6:
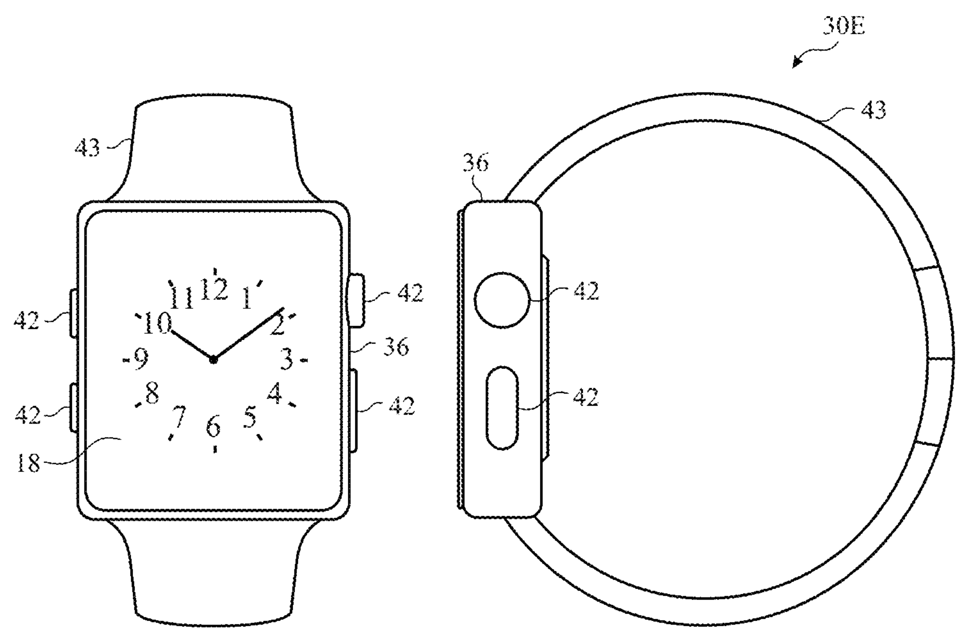
FIG. 6 is a front view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to perform various algorithms. Such programs or instructions, including those for executing the techniques described herein, executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., e.g., an operating system) encoded on such a computer program product may also include instructions that may be executed by the processor(s) 12 to enable the electronic device 10 to provide various specific functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more light emitting diode (e.g., LED) displays, or some combination of LCD panels and LED panels.

The input structures 22 of the electronic device 10 may enable a user to interact with the electronic device 10 (e.g., e.g., pressing a button to increase or decrease a volume level). The I/O interface 24 may enable electronic device 10 to interface with various other electronic devices. The I/O interface 24 may include various types of ports that may be connected to cabling. These ports may include standardized and/or proprietary ports, such as USB, RS232, Apple's Lightning® connector, as well as one or more ports for a conducted RF link. The I/O interface 24 may also include, for example, interfaces for a personal area network (e.g., PAN), such as a Bluetooth network, for a local area network (e.g., LAN) or wireless local area network (e.g., WLAN), such as an 802.11x Wi-Fi network, and/or for a wide area network (e.g., WAN), such as a 3rd generation (e.g., 3G) cellular network, 4th generation (e.g., 4G) cellular network, or long term evolution (e.g., LTE) cellular network. The I/O interface 24 may also include interfaces for, for example, broadband fixed wireless access networks (e.g., WiMAX), mobile broadband Wireless networks (e.g., mobile WiMAX), and so forth.

As further illustrated, the electronic device 10 may include a power source 26. The power source 26 may include any suitable source of power, such as a rechargeable lithium polymer (e.g., Li-poly) battery and/or an alternating current (e.g., AC) power converter. The power source 26 may be removable, such as replaceable battery cell.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include housing or enclosure 32, a display 18, input structures 22, and ports of the I/O interface 24. In one embodiment, the input structures 22 (e.g., such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif.

The handheld device 30B may include an enclosure 36 to protect interior components from physical damage and to shield them from electromagnetic interference. The enclosure 36 may surround the display 18, which may display indicator icons 39. The indicator icons 38 may indicate, among other things, a cellular signal strength, Bluetooth connection, and/or battery life. The I/O interfaces 24 may open through the enclosure 36 and may include, for example, an I/O port for a hard wired connection for charging and/or content manipulation using a connector and protocol, such as the Lightning connector provided by Apple Inc., a universal serial bus (e.g., USB), one or more conducted RF connectors, or other connectors and protocols.

User input structures 40 and 42, in combination with the display 18, may allow a user to control the handheld device 30B. For example, the input structure 40 may activate or deactivate the handheld device 30B, one of the input structures 42 may navigate user interface to a home screen, a user-configurable application screen, and/or activate a voice-recognition feature of the handheld device 30B, while other of the input structures 42 may provide volume control, or may toggle between vibrate and ring modes. Additional input structures 42 may also include a microphone may obtain a user's voice for various voice-related features, and a speaker to allow for audio playback and/or certain phone capabilities. The input structures 42 may also include a headphone input to provide a connection to external speakers and/or headphones.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 36 may be provided to protect and enclose internal components of the computer 30D such as the dual-layer display 18. In certain embodiments, a user of the computer 30D may interact with the computer 30D using various peripheral input devices, such as the keyboard 22 or mouse 38, which may connect to the computer 30D via a wired and/or wireless I/O interface 24.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., e.g., pedometer, accelerometer, heart rate monitor), or other device by another manufacturer. The display 18 of the wearable electronic device 30E may include a touch screen (e.g., e.g., LCD, OLED display, active-matrix organic light emitting diode (e.g., AMOLED) display, and so forth), which may allow users to interact with a user interface of the wearable electronic device 30E.

Any of the devices 30 described above may store one or more multi-frame assets on the memory 26 and/or storage 28, for example, or on the cloud that may be accessed via the I/O interface 24. The techniques described below may be used to convert or compress a selected multi-frame asset into a single image for humorous or artistic purposes, for example. These techniques may be embodied in any suitable combination of hardware, firmware, and/or software which may be stored and executed on the devices 30, using the processor 12, memory 26, and/or storage 28, for example. Furthermore, these techniques may be used on any multi-frame asset such as video, time-lapse photography, panoramic images, fast-burst images, etc.

Figure 7:
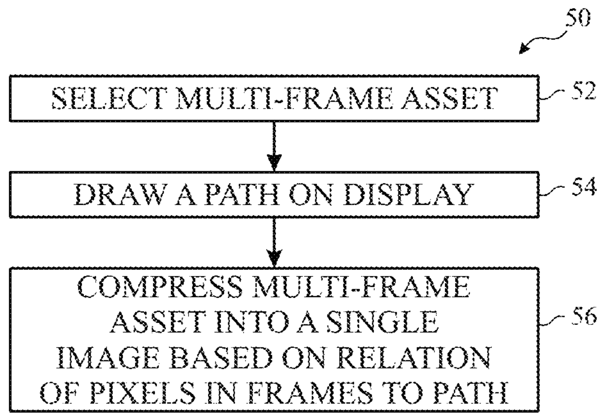
FIG. 7 is a flowchart depicting a technique for converting a multi-frame asset into a single image.

To utilize these techniques, a user may open an application that embodies these techniques on an electronic device 30. As illustrated in FIG. 7, the application may allow the selection of a multi-frame asset that is stored on the device 30 or that is accessible by the device 30, as shown in the flowchart 50 (block 52). For example, the application may allow a user to select a multi-frame asset that is stored on the memory 26 or storage 28 of the device as part of the device's photo application, e.g., camera roll, videos, or panoramas, or select a multi-frame asset that is stored in closed storage or off of the Internet. Once the multi-frame asset has been selected, a single frame from the multi-frame asset may be shown on the display 18 of the electronic device 30, and the user may draw a path on the display (block 54). The single frame may be selected by the user or automatically by the application. As discussed in greater detail below, the path is utilized to link frames in the multi-frame asset to time. Generally speaking, the beginning of the path may be linked to the beginning of the multi-frame asset and the end of the path may be linked to the end of the multi-frame asset. As discussed in greater detail below, various frames of the multi-frame asset may be compressed into a single image based on the relation of pixels in various frames to the path (block 56). The resulting image may be distorted to include humorous and/or artistic qualities, based upon the manner in which the path and resulting samples of the multi-frame asset are converted into the image.

Figure 8:
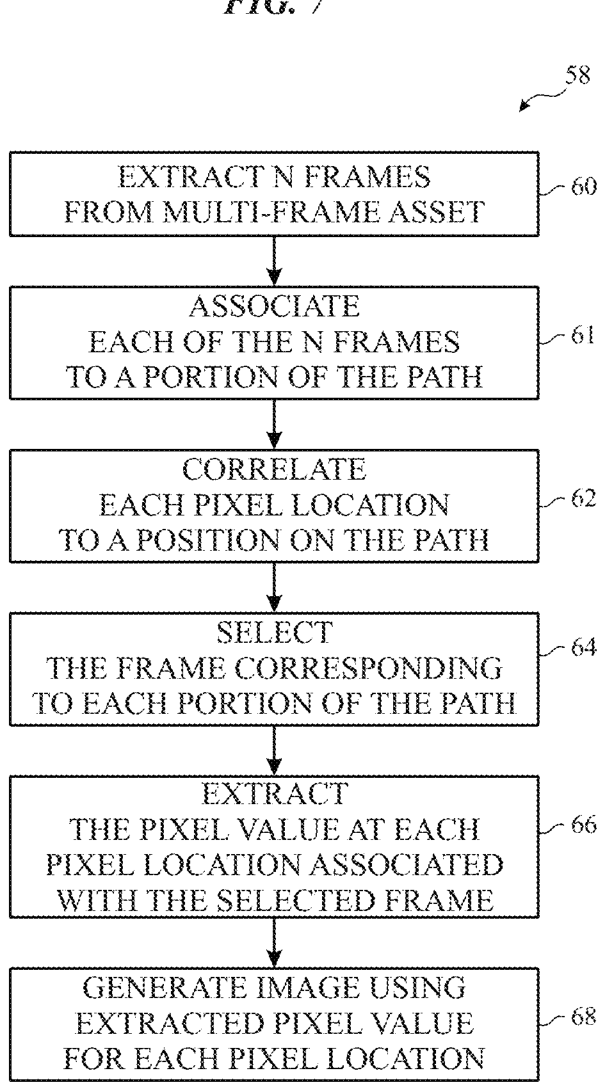
FIG. 8 is a flowchart depicting one example of the technique illustrated in FIG. 7.

One example of how a multi-frame asset may be compressed into a single image is illustrated in the flowchart 58 of FIG. 8. Once a multi-frame asset has been selected and a path has been drawn on the display, a number of frames N are extracted from the multi-frame asset (block 60). For example, the extracted frames may be kept in a buffer, such as might be associated with the processor 12, memory 26, and/or storage 28. For example, to generate a 1280×780 image from 720p video, 1280 frames may be selected from the multi-frame asset in order to completely hide slice boundaries and to make the resulting image very smooth, as described in further detail below. However, the selection of a fewer number of frames will typically result not only in faster processing, but may also yield unique or desirable humorous or artistic qualities of the resulting image. By way of example, if 100 frames were extracted from a multi-frame asset having 10,000 frames, then every hundredth frame (frame 1, frame 100, frame 200, . . . frame 9,900, frame 10,000) would then be extracted and stored.

Each of the N frames is associated with a portion of the path (block 61). This, in affect, can be used to create a time map or time line. For example, the path may correspond to a time line extending from a beginning of the path to an end of the path, and each of the plurality of extracted frames may be associated with a respective portion of the path so that extracted frames from earlier in the multi-frame asset correspond to portions of the path earlier on the time line and so that extracted frames from later in the multi-frame asset correspond to portions of the path later on the time line. Of course, each extracted frame can be associated with the path in any manner.

Figure 9:
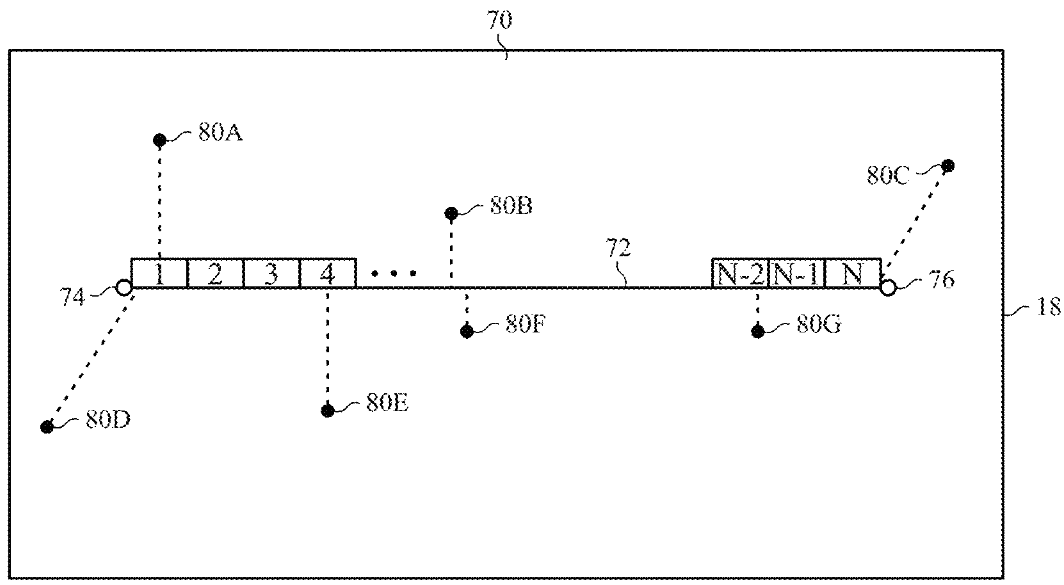
FIG. 9 is a depiction of a display screen having a first path drawn thereon.

Further, each pixel location on the display 18 may be correlated to a position on the path (block 62). Referring also to FIG. 9, a display 18 shows a frame 70 of the selected multi-frame asset, as well a linear path 72 that has been drawn from a point 74 on the left side of the display 18 to a point 76 on the right side of the display 18. Different portions of the path 72 are associated with a respective one of the extracted frames N. As illustrated, the first portion of the path 72 is associated with frame 1, the second portion with frame 2, and so on until the last portion of the path 72 is associated with frame N.

In this example, each pixel location 80 on the display 18 is correlated to a position on the path 72 by computing the shortest distance from each pixel location 80 to the path 72. However, as described below, other suitable correlation techniques may be used. In the example illustrated in FIG. 9, seven pixels locations 80*a*-*g* are illustrated for the purpose of explaining how each pixel location 80 on the display 18 may be correlated to a position on the path 72. The shortest distance from pixel location 80*a* to the path 72 results in the correlation of the pixel location 80*a* to frame 1. Similarly, the shortest path from the pixel location 80*b* to the path 72 results in the pixel location 80*b* being correlated with a frame somewhere between frame 4 and frame N−2. The shortest path from the pixel location 80*c* to the path 72 results in the pixel location 80*c* being correlated to the last frame N. Similarly, the shortest path from the pixel location 80*d* to the path 72 results in the pixel location 80*d* being correlated to frame 1. Using the same technique, the pixel location 80*e* is correlated to frame 4, 80*f* is correlated to a frame between 4 and N−2, and the pixel location 80*g* is correlated to frame N−2.

Once all the pixel locations on the display 18 have been correlated to a position on the path 72, and thus also correlated to a particular frame, the frame corresponding to each time is selected (block 64). For each frame, the pixel value from that frame is extracted for each pixel location associated with the selected frame (block 66). In the example illustrated in FIG. 9, for instance, frame 1 would be selected for the first time period defined by the path 72, the pixel values for each pixel location associated with frame 1, such as pixel locations 80*a* and 80*d*, would be extracted from frame 1 and stored. The process would repeat for frames 2 through N. Using the pixel values that have been extracted from the various frames 1−N, an image is generated for each pixel location on the display 18 (block 68).

Figure 10:
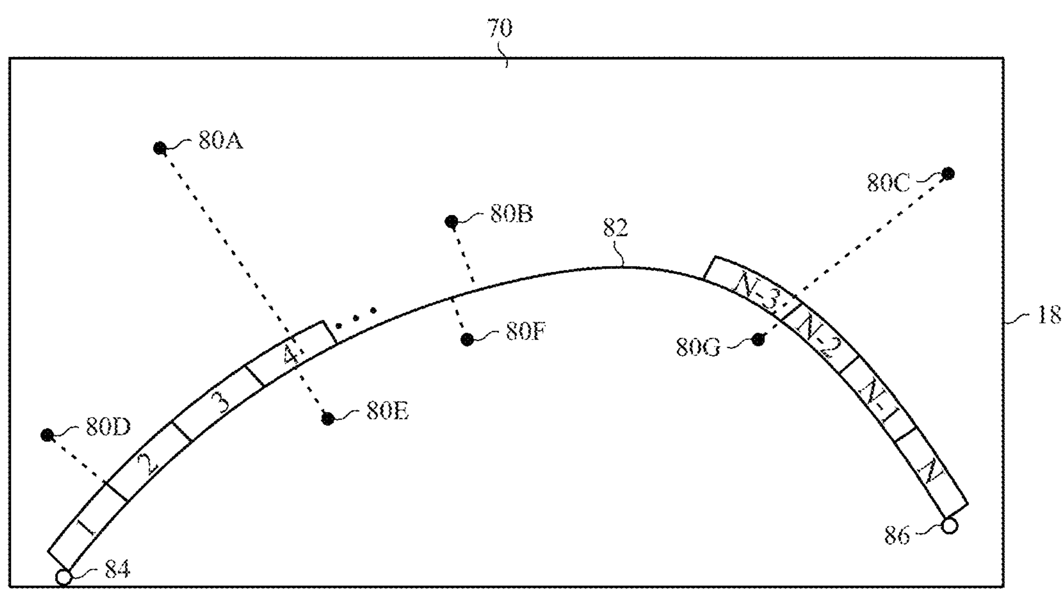
FIG. 10 is a depiction of a display screen having a second path drawn thereon.

It should be understood that the correlation between each pixel location 80 and a position on the path depends upon the shape and position of the path and where each pixel location 80 is located relative to the path. For example, FIG. 10 illustrates a curved path 82 that begins at a point 84 and ends at a point 86. As compared to the path 72, the path 82 is not only curved as opposed to flat, but it is also longer. As a result, for the same number of frames N, each of the frames 1-N corresponds to a slightly longer portion of the path 82 as compared to the path 72. Furthermore, because the shape, length, and position of the path 82 differs from the path 72, the correlation of the pixel locations 80 to the path 82 will differ from the correlation of the pixel locations 80 to the path 72. For example, when the shortest distance to the path 82 from the pixel location 80*a* is computed, it results in pixel location 80*a* correlating a position on the path 82 that corresponds to frame 4. With regard to pixel locations 80*a* and 80*f*, whereas the pixel location 80*b* corresponded to an earlier portion on the path 72 as compared to pixel location 80*f*, the pixel location 80*f* corresponds to an earlier location on the path 82 as compared to pixel location 80*b*. The pixel location 80*c* corresponds to a location on the path 82 that is associated that is associates with frame N−3, the pixel location 80*d* corresponds to a location on the path 82 associated with frame 2, the pixel location 80*e* corresponds to a location on the path 82 associated with frame 4, and the pixel location 80*g* corresponds to a location on the path 82 associated with frame N−2. Of course, although not illustrated specifically, other pixel locations 80 correspond to different locations on the path 82 as compared to the path 72. Thus, when the frame corresponding to each time period is selected and the pixel values at each pixel location 80 associated with that frame are extracted, the resulting image generated using the multi-frame asset and the path 82 will likely be different than the image generated using the same multi-frame asset and the path 72.

Figure 11:
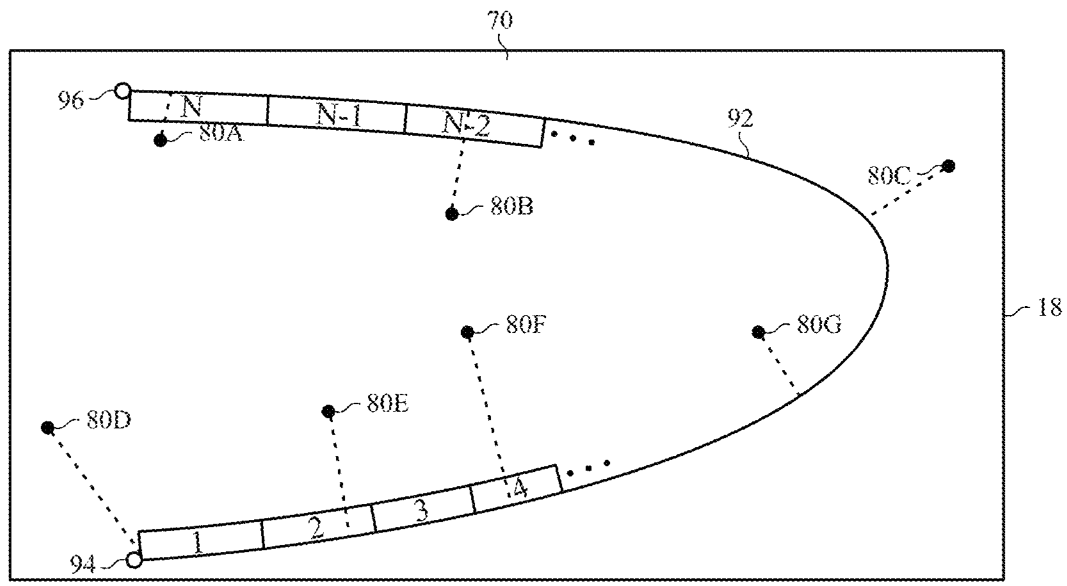
FIG. 11 is a depiction of a display screen having a third path drawn thereon.

FIG. 11 illustrates yet another curved path 92 that begins as at a point 94 and ends at a point 96. As compared to the previously discussed paths 72 and 82, the path 92 begins at the left side of the image 70, traverses across the display 18, before curving back to end on the left side of the image 70. Further, because the path 92 is longer than the path 72 and the path 82, for the same number of frames N, each of the frames 1-N corresponds to a longer portion of the path 92 as compared to the paths 72 and 82. Furthermore, because the shape, length, and position of the path 92 differs from the paths 72 and 82, the correlation of the pixel locations 80 to the path 92 differs from the correlation of the pixel locations 80 to the paths 72 and 82. For example, when the shortest distance to the path 92 from the pixel location **80*a* is computed, it results in pixel location 80*a* correlating to a position on the path 92 that corresponds to the last frame N. The pixel location 80*b* corresponds to a position on the path 92 that corresponds to frame N−2. The pixel locations 80*c* and 80*g* correlate to positions on the path 92 between frame 4 and frame N−2. The pixel location 80*d* correlates to a position on the path 92 that corresponds to frame 1, the pixel location 80*e* correlates to a position on the path 92 that corresponds to frame 2, and the pixel location 80*f* correlates to a position on the path 92 that corresponds to frame 4. Thus, when the frame corresponding to each time period is selected and the pixel values at each pixel location 80 associated with that frame are extracted, the resulting image generated using the multi-frame asset and the path 92 will likely be different that the images generated using the same multi-frame asset and the paths 72 and 82**.

Figure 12A:
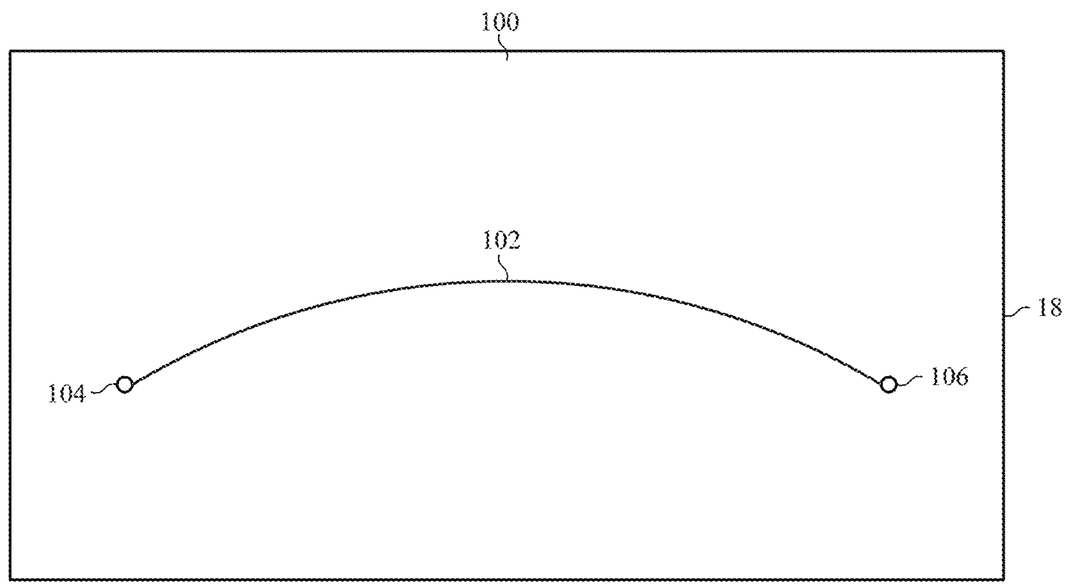
FIG. 12A is a single frame of a multi-frame asset, such as a video that starts with white pixels and ends with black pixels, having a curved path drawn thereon.
Figure 12B:
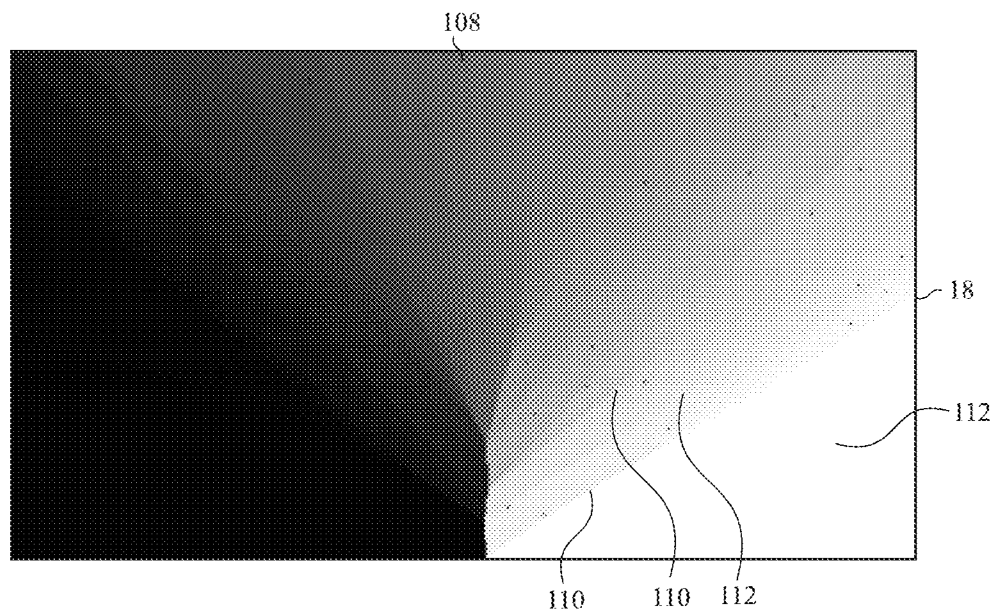
FIG. 12B illustrates a final image resulting from the multi-frame asset and the curved path of FIG. 12A.

To demonstrate a very simple example, a multi-frame asset may be a video that begins with all black pixels and gradually lightens until it ends with all white pixels. A frame 100 may be selected from that video and presented on a display 18, all illustrated by a frame of all white pixels in FIG. 12A. If curved path 102 is drawn on the display 18 from point 104 to point 106, and if the techniques described above are performed, the resulting image may look like the image 108 illustrated in FIG. 12B. As can be seen, the image 108 includes black pixels on the left side that gradually change to white pixels on the right side. This is a result of both the video beginning with black pixels and ending with white pixels, as well as the path 102 that started the point 104 on the left side of the image 100 and ended at the point 106 on the right side of the image 100. In other words, most of the pixel locations on the left side of the display 18 would likely correlate to a position on the path 102 that corresponds to earlier selected frames of the video, while pixel locations on the right side of the display 18 would likely correlate to positions on the path that correspond to later selected frames of the video.

Further, it should be noticed that the resulting image 108 is fanned out a bit, similar to the manner in which one holds a hand of playing cards. Said another way, the bottom portion of the image 108 is primarily either black or white, while the upper portion of the image 108 shows a more gradual shift from black pixels to gray pixels to white pixels. This effect is caused by the curvature of the path 102. Indeed, it can readily be appreciated that virtually all of the pixels to the left of the starting point 104 would correspond to frame 1 of the selected frames of the video, and virtually all of the pixels to the right of the ending point 106 would correspond to last selected frame N of the video. Similarly, pixel locations near the bottom of the display 18 would most likely correlate to the starting point 104 of the path 102 on the left side of the display 18 and to the end point 106 of the path 102 on the right side of the display 18. Conversely, pixel locations in the upper portion of the display 18 would likely correlate to positions on the path 102 that are more evenly distributed. This leads to the pattern shown in the resulting image 108.

Furthermore, it should be noticed that there are certain striations or lines 110 in the resulting image 108 that lead to various slices 112. These lines 110 and slices 112 are the result of artifacts created because the selected number of frames N is less than the number of vertical columns of pixels in display 18. As will be discussed in greater detail below, the number of frames N may be selected to produce a resulting image with a desired effect.

Figure 13:
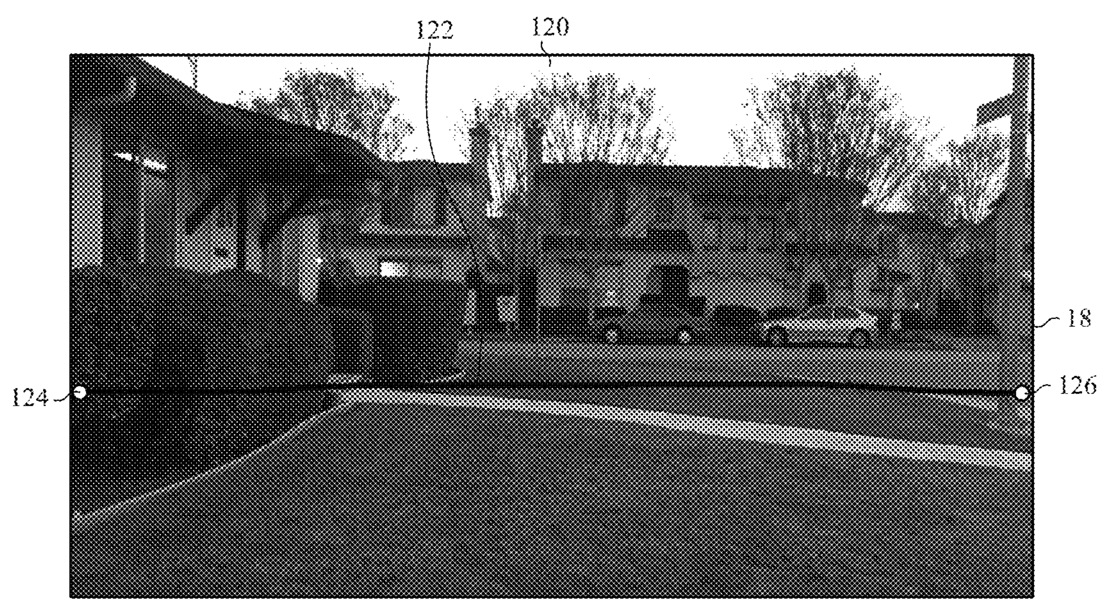
FIG. 13 depicts a single frame a multi-frame asset, such as a time-lapse video of a neighborhood, with a relatively straight path drawn on the display from left to right.
Figure 14:
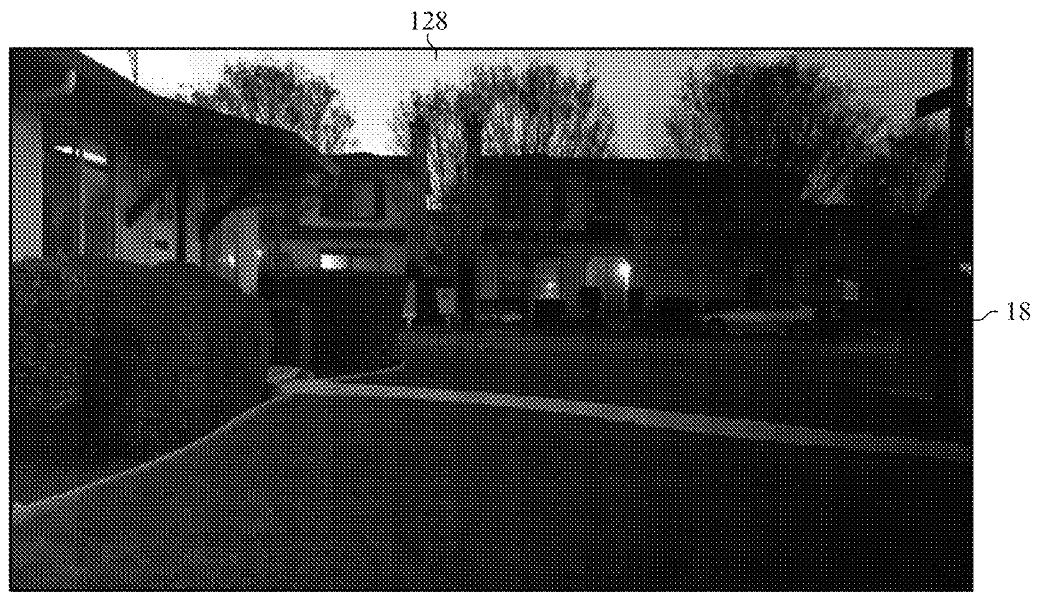
FIG. 14 illustrates a single image resulting from the multi-frame asset and path illustrated in FIG. 13.

As another example, FIG. 13 illustrates a frame 120 from a multi-frame asset such as day-to-night time lapse video of a neighborhood. Once the frame 120 from the day-to-night time lapse video is selected, it may be displayed on the display 18 of an electronic device 30. As further illustrated in FIG. 13, a user may draw a path 122 on the selected frame 120 on the display 18 from a starting point 124 to an ending point 126. Once the multi-frame asset has been selected and the path 122 has been drawn on the display 18, the multi-frame asset may be compressed into a single image 128 in accordance with the techniques described above with respect to FIG. 8, for example. As can be seen in FIG. 14, the resulting image 128 shows the left side of the neighborhood in the sunlight, while the right side of the neighborhood is shown at night, with a gradual shift from day to night.

Figure 15:
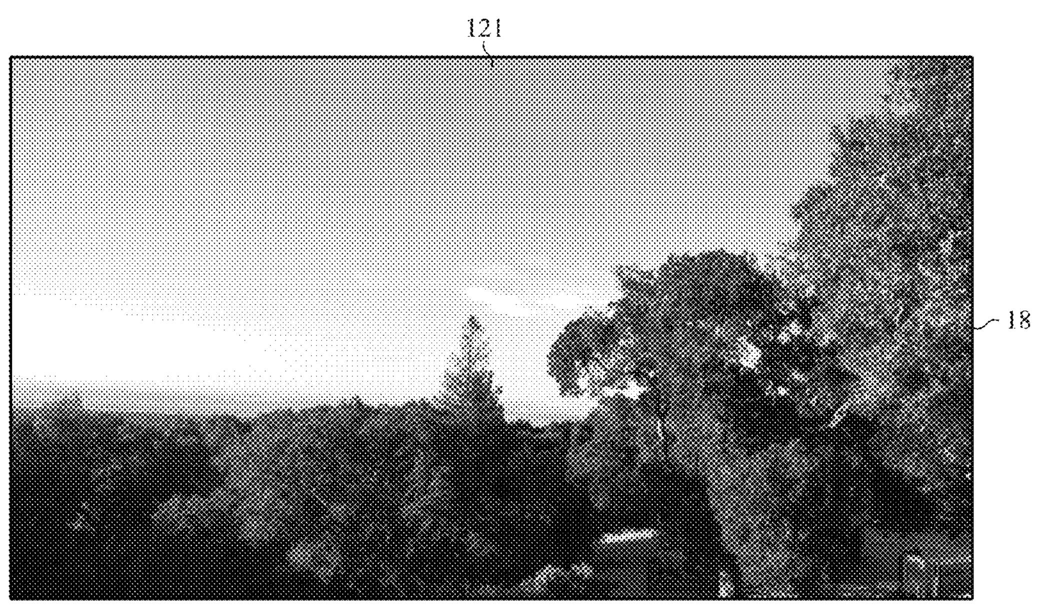
FIG. 15 illustrates a single frame of a multi-frame asset, such as a time-lapse video of a landscape.
Figures 16, 17:
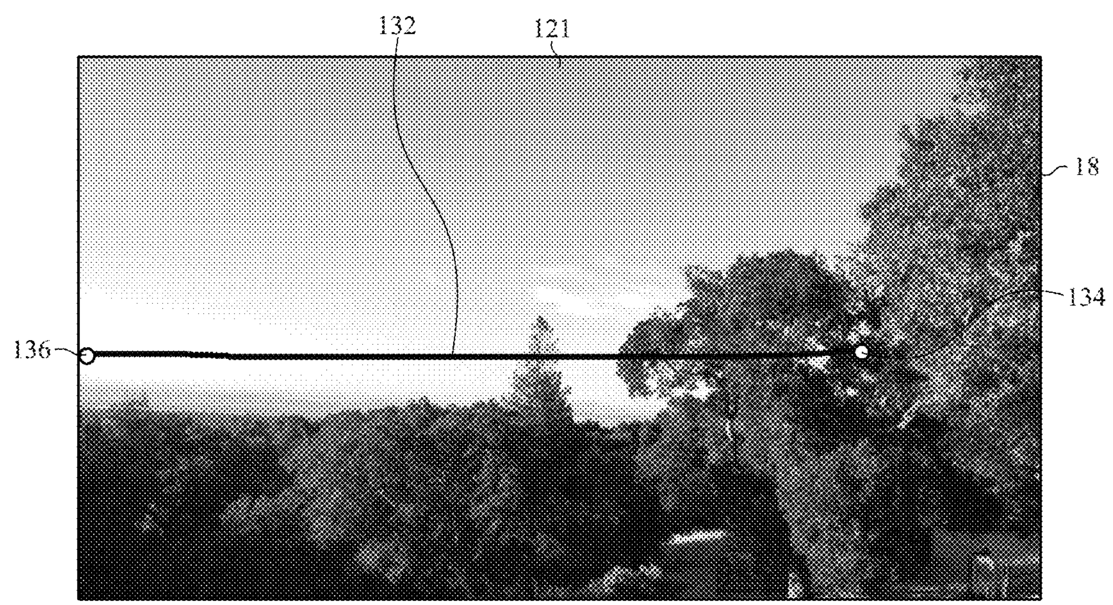
FIG. 16 illustrates the single frame of FIG. 15 with a relatively straight path drawn on the display from right to left.
FIG. 17 illustrates a single image resulting from the multi-frame asset and path of FIGS. 15 and 16.

While the resulting image 128 is rather elegant in the manner in which the neighborhood transitions from day to night from the left side of the image 128 to the right side of the image 128, may other images are possible using the same type of day-to-night time lapse video depending upon the type of path a user chooses to draw on the display 18. For example, FIG. 15 illustrates a frame 121 of another multi-frame asset such as a day-to-night time-lapse video of a landscape. As shown in FIG. 16, a path 132 that begins at a point 134 near the right portion of the selected frame 121 and extends along a relatively straight path across the display 18 until it ends at a point 136 near the left portion of the selected frame 121. When the day-to-night video is compressed into a single image 138 based on the relation of the pixels in the selected frames to the path 132, the resulting image 138 as illustrated in FIG. 17 shows the right side of the landscape in the sunlight, while the left side of the landscape is shown at night, with a gradual shift from day to night.

Figure 18:
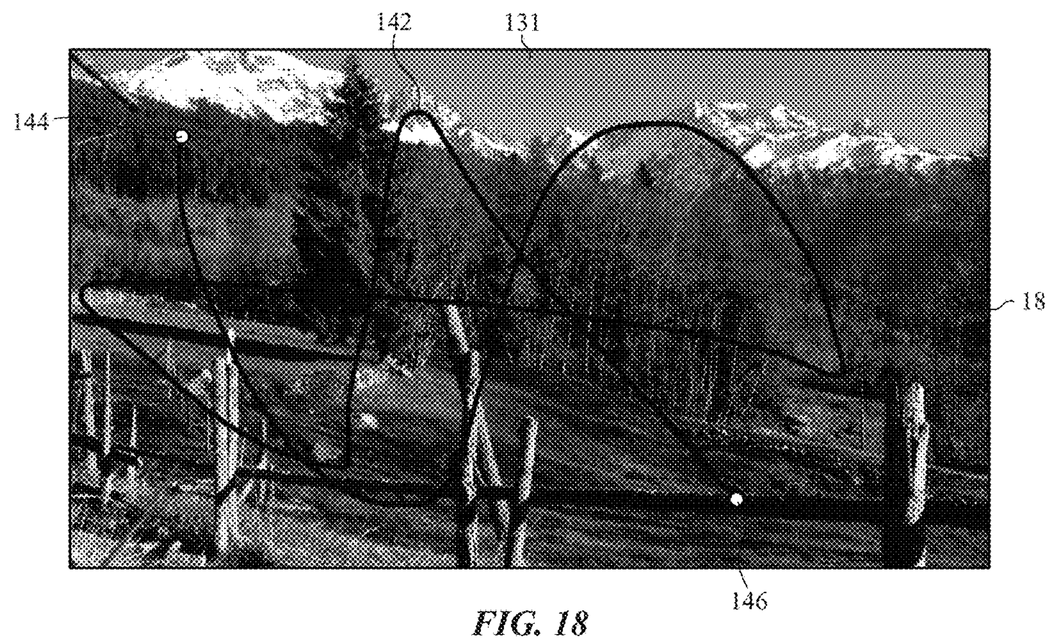
FIG. 18 illustrates a single frame of a multi-frame asset, such as a time-lapse video of a mountain scene, with a convoluted path drawn on the display.
Figure 19:
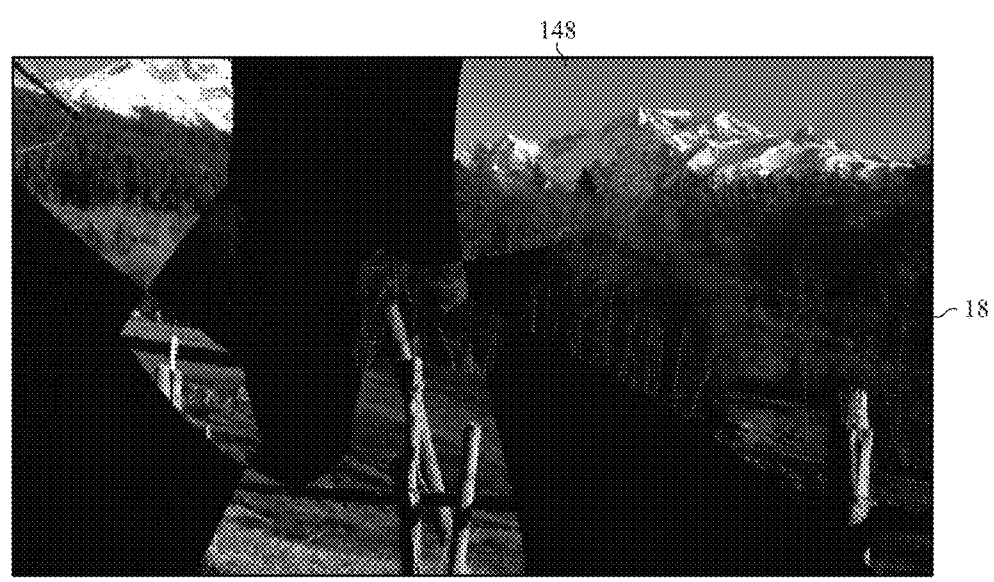
FIG. 19 illustrates a single image resulting from the multi-frame asset and path of FIG. 18.

In yet another example, FIG. 18 illustrates a frame 131 of a multi-frame asset such as a time-lapse video of a mountain scene. Here, a path 142 begins at a point 144, serpentines back and forth and up and down the display 18, and ends at a point 146. When the day-to-night time lapse video is compressed into a single image based on the path 142, the resulting image 148 produced is illustrated in FIG. 19. As can be seen, the complexity of the path 142 creates a complex, interesting and artistic transitions in the resulting image 148.

Figure 20:
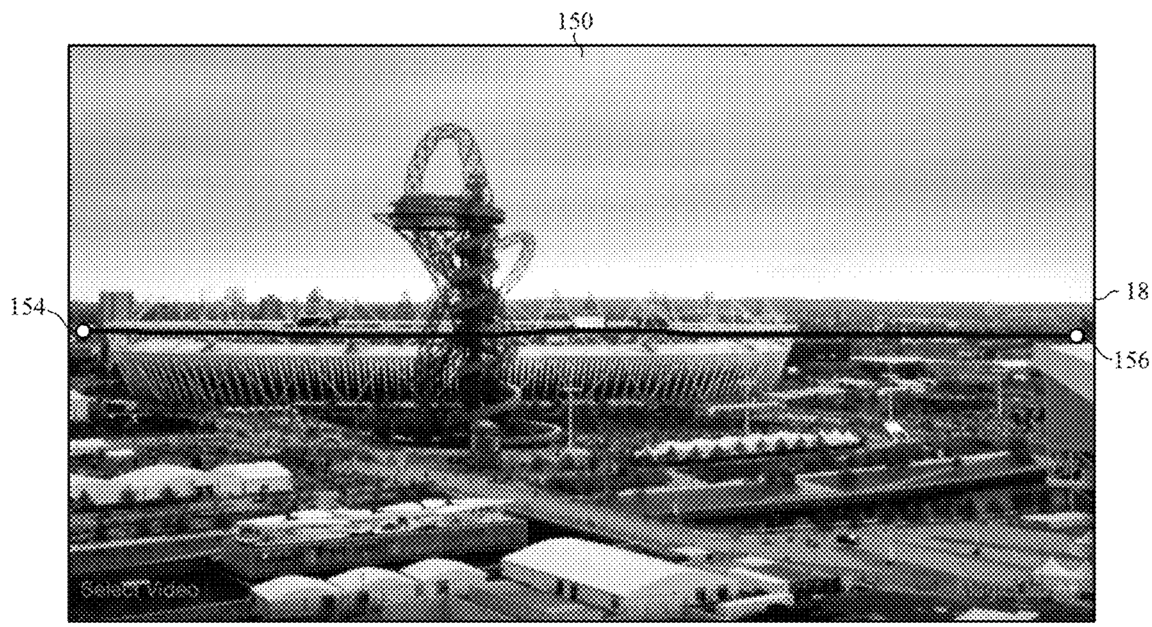
FIG. 20 illustrates a single frame from a multi-frame asset, such as a time-lapse video of a cityscape, having a relatively straight path drawn on this display.
Figure 21:
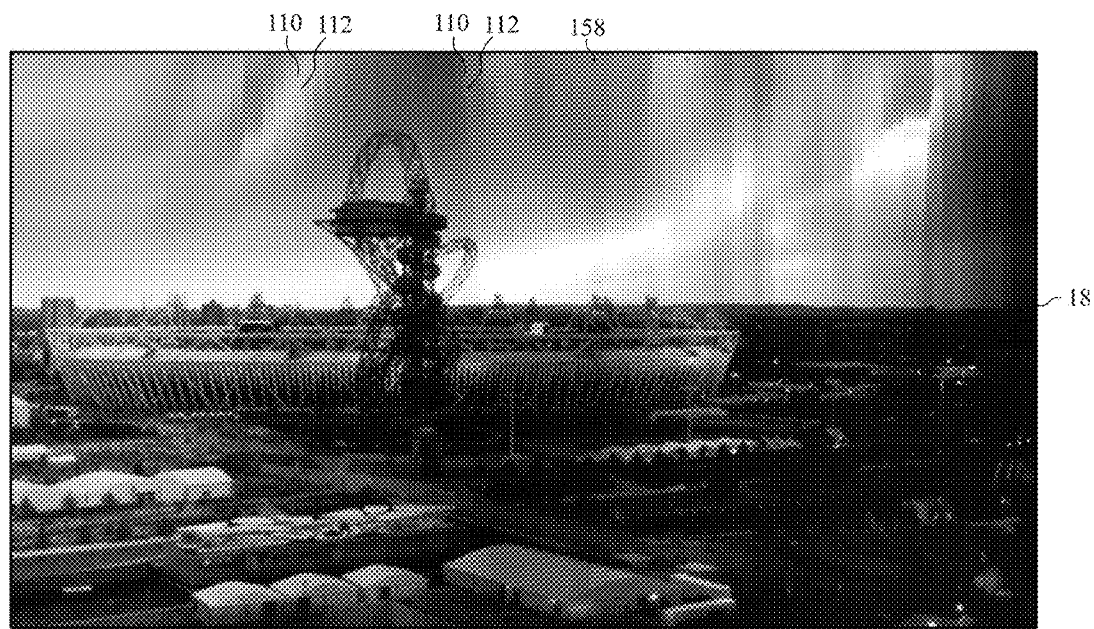
FIG. 21 illustrates an image resulting from the multi-frame asset and path illustrated in FIG. 20.

FIG. 20 illustrates a selected frame 150 of another day-to-night time lapse video on a display 18. A simple horizontal path 152 that begins a point 154 and ends at a point 156 has been drawn on the selected frame 150. When the day-to-night time lapse video is compressed into a single image based on the relation of pixels in selected frames to the path 152, the resulting image 158 generated is illustrated in FIG. 21. Similar to the cityscape example illustrated in FIGS. 14 and 15, the resulting image 158 demonstrates a gradual transition from daytime views on the left hand side of the image 158 to night time views on the right side of the image 158. However, more importantly, it should be noted that many lines 110 and slices 112 are clearly visible, particularly in the sky illustrated in the upper part of the image 158. As discussed previously, these sorts of visual artifacts are created primarily because the number of frames N extracted from the day-to-night time lapse video is less than the number of horizontal pixels on the display 18.

Figure 22:
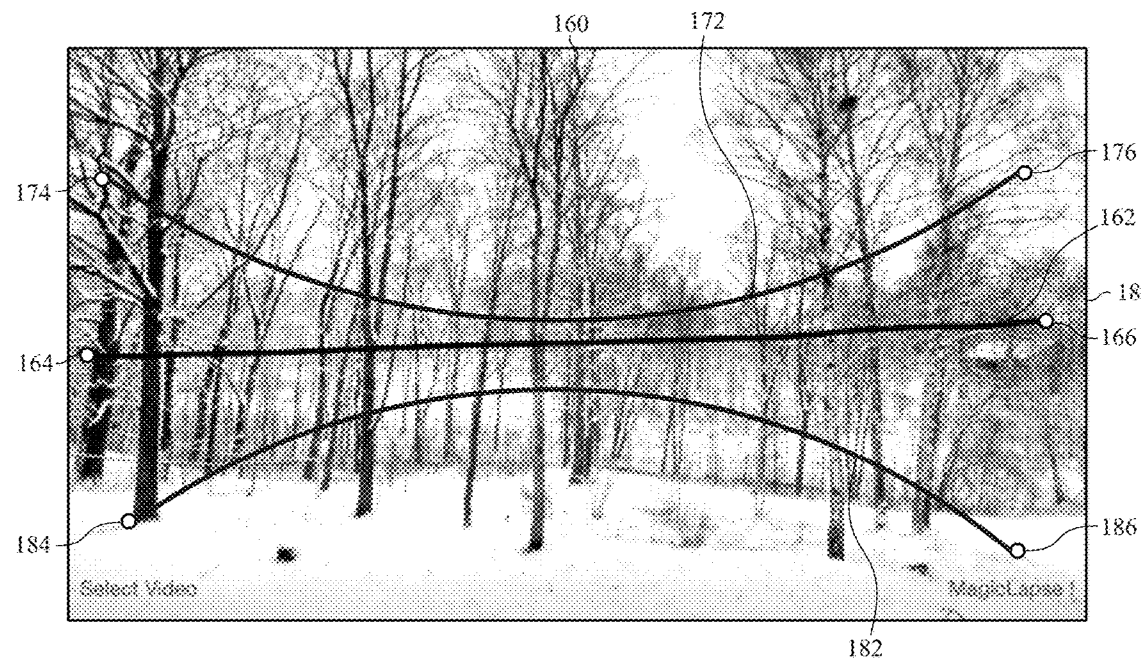
FIG. 22 illustrates a single frame of a multi-frame asset, such as one-year time lapse footage of a landscape including trees, having three possible paths drawn on the display.
Figure 23:
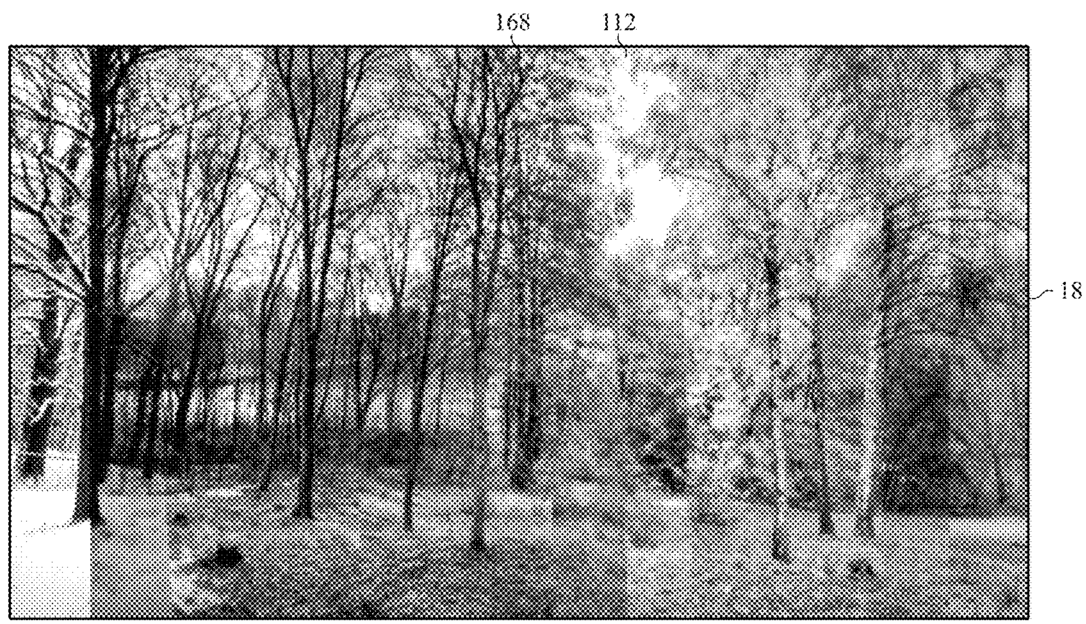
FIG. 23 illustrates an image resulting from the multi-frame asset and the relatively straight path illustrated in FIG. 22.
Figures 24, 25:
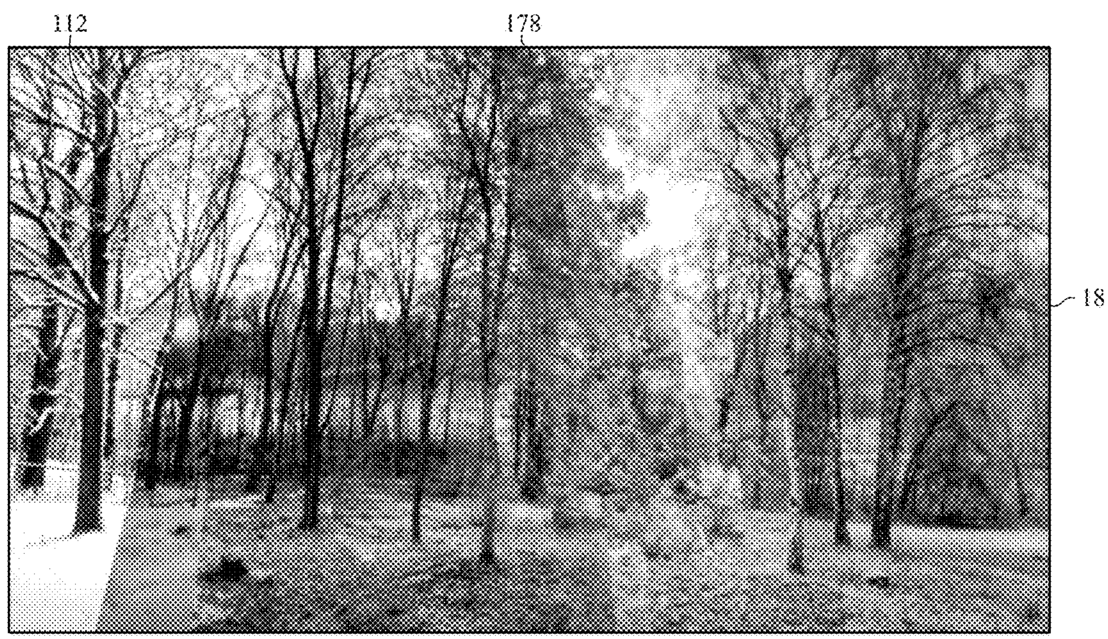
FIG. 24 illustrates an image resulting from the multi-frame asset and upwardly curving path illustrated in FIG. 22.
FIG. 25 illustrates an image resulting from the multi-frame asset and downwardly curving path illustrated in FIG. 22.

As one final example, FIGS. 22-25 illustrate different images that can result from processing a multi-frame asset using different paths. In this example, the multi-frame asset is a one-year time lapse video of a landscape, and a frame from that video is illustrated in FIG. 22 as an image 160 on the display 18. Various different paths may be drawn on the image 160. For example, the paths may include a horizontal path 162 starting at a point 164 and ending at a point 166, and upwardly curving path 172 starting at a point 174 and ending at a point 176, or a downwardly curving path 182 starting at a point 184 and ending at a point 186. The resulting images 168, 178, and 188 for each of these paths 162, 172, and 182 respectively, are illustrated in FIGS. 23-25.

As can be seen in FIG. 23, the resulting image 168 includes 16 relatively even slices 112, which indicates that 16 frames were extracted from the one-year time lapse video. Further, because the path 162 begins at the left side of the image 160 and ends at the right side of the image 160, the resulting image 168 begins with a first slice that depicts and early portion of the video in the dead of winter, and the remaining slices 112 progress through the end of winter, spring, summer, and fall, thus creating an artistically interesting image. The resulting images 178 and 188 illustrated in FIGS. 24 and 25, respectively, have the same number of slices 112 and also progress from a first slice 112 depicting an early portion of the video in the dead of winter, with the following slices 112 progressing through spring, summer, and fall. However, because the manner in which the paths 172 and 182 curve, the resulting slices 112 in the respective resulting images 178 and 188 are fanned out either upwardly or downwardly, again creating artistically interesting images.

Although the above examples have been described where the technique divides the path into equal segments based on the number of selected frames, it should be understood that the segments need not be equal to one another. Indeed, the size of each segment of a path corresponding to a given frame may gradually increase from one end of the path to the other, gradually decrease from one end of the path to the other, increase toward the middle and decrease towards the ends, be random, etc. Further, each of the above examples has been described where the technique correlates each pixel location to the shortest distance between the pixel location and the path. However, the pixel locations may be correlated to the path in any manner, e.g., the longest distance from each pixel location to the path, a given angle between each pixel location and the path, etc. Finally, a user interface for an application that embodies these techniques can be configured to allow a user to select a multi-frame asset, select a frame from the multi-frame asset to be displayed, select the manner in which pixel locations are correlated to a path, select the number of frames to be extracted, and/or select the manner in which the path is segmented by the selected number of frames.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method of transforming a multi-frame asset into a single image, the method comprising:

displaying a frame from the multi-frame asset on a display, wherein the display comprises a plurality of pixel locations;

associating each of a plurality of extracted frames of the multi-frame asset to a respective portion of a path disposed on the display;

determining a pixel value of each pixel location of the plurality of pixel locations based on an association of the pixel location to a position on the path disposed on the display; and compressing the multi-frame asset into the single image based on the determined pixel values.

2. The method, as set forth in claim 1, wherein displaying a frame from the multi-frame asset comprises:

selecting a frame from the multi-frame asset in response to a user input.

3. The method, as set forth in claim 2, wherein the user input comprises:

selecting a multi-frame asset from a photo application of an electronic device; and selecting a frame from the selected multi-frame asset.

4. The method, as set forth in claim 2, wherein the user input comprises:

selecting a multi-frame asset from cloud storage using an electronic device; and selecting a frame of the selected multi-frame asset.

5. The method, as set forth in claim 2, wherein the user input comprises:

selecting a multi-frame asset from the Internet using an electronic device; and selecting a frame of the selected multi-frame asset.

6. The method, as set forth in claim 1, wherein the multi-frame asset comprises a video, time-lapse photography, panoramic images, or fast-burst images, or any combination thereof.

7. The method, as set forth in claim 1, comprising:

disposing the path on the display in response to a user input.

8. The method, as set forth in claim 7, wherein disposing the path on the display in response to a user input comprises:

generating the path on the display in response to touch inputs received by the display in response to a user drawing the path on the display.

9. The method, as set forth in claim 1, wherein the determining a pixel value of each pixel location comprises:

extracting the value of a pixel corresponding to the each pixel location on a selected one of the plurality of extracted frames associated with the position on the path with which the each pixel location is associated and using the extracted value to determine the pixel value of the each pixel location;

wherein the association of a pixel to a position on the path is based on proximity of the pixel location to the position on the path.

10. A method of transforming a multi-frame asset into a single image, the method comprising:

extracting a plurality of frames from a multi-frame asset;
associating each of the plurality of extracted frames to a respective portion of a path disposed on a display;
correlating each pixel location on the display to a position on the path;
for each of the respective extracted frames, extracting pixel values from the extracted frame for each pixel location correlated to a position on the path that is associated with the respective extracted frame; and
generating a single image using the extracted pixel value for each pixel location on the display.

11. The method, as set forth in claim 10, wherein extracting a plurality of frames from a multi-frame asset comprises:
selecting every Nth frame of the multi-frame asset, where N is an integer.

12. The method, as set forth in claim 11, wherein N is selected based on a user input.

13. The method, as set forth in claim 10, wherein the path corresponds to a time line extending from a beginning of the path to an end of the path, and wherein associating each of the plurality of extracted frames to a respective portion of the path comprises associating each extracted frame to a respective portion of the path so that extracted frames from earlier in the multi-frame asset correspond to portions of the path earlier on the time line and so that extracted frames from later in the multi-frame asset correspond to portions of the path later on the time line.

14. The method, as set forth in claim 10, wherein correlating each pixel location on the display to a position on the path comprises:
determining a shortest distance from each pixel location to the path.

15. An electronic device, comprising:
a display;
a processor operably coupled to the display;
a memory operably coupled to the processor, the memory storing instructions that when executed by the processor cause the electronic device to:
extract a plurality of frames from a multi-frame asset;
associate each of the plurality of extracted frames to a respective portion of a path disposed on the display;
correlate each pixel location on the display to a position on the path;
for each of the respective extracted frames, extract pixel values from the extracted frame for each pixel location correlated to a position on the path that is associated with the respective extracted frame;
generate a single image using the extracted pixel value for each pixel location on the display; and
display the single image on the display.

16. The electronic device, as set forth in claim 15, wherein the electronic device comprises a smartphone, a desktop computer, a laptop computer, a tablet computer, or a wearable device.

17. The electronic device, as set forth in claim 15, wherein the instruction when executed by the processor cause the electronic device to:
display a frame from the multi-frame asset on a display.

18. The electronic device, as set forth in claim 17, wherein the instruction when executed by the processor cause the electronic device to:
select the frame displayed on the display from the multi-frame asset in response to a user input.

19. The electronic device, as set forth in claim 18, wherein the electronic device comprises a photo application and wherein the memory is configured to store a plurality of multi-frame assets for the photo application, and wherein the user input comprises:
selecting a multi-frame asset from the photo application; and
selecting a frame from the selected multi-frame asset.

20. The electronic device, as set forth in claim 18, wherein the electronic device comprises an input/output interface, and wherein the user input comprises:
selecting a multi-frame asset from cloud storage using the input/output interface; and
selecting a frame of the selected multi-frame asset.

21. The electronic device, as set forth in claim 18, wherein the electronic device comprises an input/output interface, and wherein the user input comprises:
selecting a multi-frame asset from the Internet using the input/output interface; and
selecting a frame of the selected multi-frame asset.

22. The electronic device, as set forth in claim 15, wherein the instructions that when executed by the processor cause the electronic device to extract a plurality of frames from a multi-frame asset comprise instructions that when executed by the processor cause the electronic device to:
select every Nth frame of the multi-frame asset, where N is an integer.

23. The electronic device, as set forth in claim 22, wherein N is selected based on a user input.

24. The electronic device, as set forth in claim 15, wherein the path corresponds to a time line extending from a beginning of the path to an end of the path, and wherein associating each of the plurality of extracted frames to a respective portion of the path comprises associating each extracted frame to a respective portion of the path so that extracted frames from earlier in the multi-frame asset correspond to portions of the path earlier on the time line and so that extracted frames from later in the multi-frame asset correspond to portions of the path later on the time line.

25. The electronic device, as set forth in claim 15, wherein correlating each pixel location on the display to a position on the path comprises:
determining a shortest distance from each pixel location to the path.

* * * * *